US005487086A

United States Patent [19]

Bhaskar

[11] Patent Number: 5,487,086

[45] Date of Patent: Jan. 23, 1996

[54] TRANSFORM VECTOR QUANTIZATION FOR ADAPTIVE PREDICTIVE CODING

[75] Inventor: B. R. Udaya Bhaskar, Gaithersburg, Md.

[73] Assignee: Comsat Corporation, Bethesda, Md.

[21] Appl. No.: 759,361

[22] Filed: Sep. 13, 1991

[51] Int. Cl.$^6$ .......... H04B 14/04

[52] U.S. Cl. .......... 375/243; 375/246; 375/240; 382/253; 348/405; 348/414; 348/417; 348/422

[58] Field of Search .......... 375/26, 27, 122; 381/31, 36, 41, 43, 29, 30; 358/133, 135, 136; 382/41, 43, 56; 348/394, 395, 403, 405, 414, 417, 422

[56] References Cited

U.S. PATENT DOCUMENTS 4,184,049 1/1980 Crochiere et al. .......... 381/31
4,734,767 3/1988 Kaneko et al. .......... 358/133
4,845,559 7/1989 Labit et al. .
4,868,867 9/1989 Davidson et al. .
4,982,285 1/1991 Sugiyama .......... 358/136
5,068,723 11/1991 Dixit et al. .
5,077,798 12/1991 Ichikawa et al. .
5,086,471 2/1992 Tanaka et al. .
5,109,451 4/1992 Aono et al. .......... 382/56

*Primary Examiner*—Stephen Chin
*Assistant Examiner*—Don Vo
*Attorney, Agent, or Firm*—Sughrue, Mion, Zinn, Macpeak & Seas

[57] ABSTRACT

Before transmitting signals to a receiver, the signals are subjected to adaptive prediction to generate a residual signal for transmission, and the residual signal is then transformed into frequency domain coefficients, the coefficients are grouped together to form vectors, and the vectors are then quantized.

5 Claims, 3 Drawing Sheets

TRANSFORM VECTOR QUANTIZATION FOR ADAPTIVE PREDICTIVE CODING

FIELD OF THE INVENTION

The present invention relates to digital signal transmission systems, and more specifically to digital signal transmission systems using adaptive predictive coding techniques.

BACKGROUND OF THE INVENTION

Adaptive predictive coding (APC) methods are widely used for high quality coding of speech signals. The details are discussed in U.S. patent application Ser. No. 07/603,104 by the present inventor and commonly assigned to COMSAT and which issued as U.S. Pat. No. 5,206,884 on Apr. 27, 1993. That application is herein incorporated by reference.

The concept of prediction filtering followed by residual quantization forms the basis for a wide range of coding techniques at various bit rates and quality for voice signals. The most direct implementation of this concept is found in adaptive predictive coding (APC) (B. S. Atal, "Predictive Coding of Speech at Low Bit Rates," IEEE Transactions on Communications, Vol. Com-30, No 4, April 1982). In APC, signal correlations are significantly reduced by adaptive short and long term prediction filters. The residual signal is then quantized by an adaptive quantizer, inside a quantization noise feedback loop. The adaptation ensures that the parameters of the predictors and the quantizer match the characteristics of the quasistationary input signal, so that the efficiency of these operations is maximized. In forward block adaptation, the signal is processed in blocks and parameters are determined for each block based on the uncoded signal. This form of adaptation requires the transmission of the prediction and quantization parameters along with the transmission of the residual. Backward sample adaptation is also possible, leading to analysis by synthesis schemes such as the low delay code excited linear prediction (LD-CELP). The proposed invention is relevant to the forward adaptive schemes.

The size of the block is highly dependent on signal characteristics and in particular on the quasistationary behavior of the signal. For telephony voice signals, sampling rates are generally in the range 6.4–8 kHz. At these sampling rates, block sizes are in the range 160–256 sample/block. For generality, block size will be denoted by N in the following discussion.

Prediction Filtering

Prediction is usually carried out in two states: a short delay predictor that removes adjacent sample correlations followed by a long delay predictor that removes correlations at longer delays. For voice signals, the short delay predictor removes the resonances due to the vocal cavity formants and the long delay predictor removes the periodicity introduced by the pitch periodic glottal excitation during voiced sounds. The short term prediction filter is defined by its transfer function S(z):

$$S(z)=1-A(z)=1-\sum_{m=1}^{M} a_m z^{-m},$$

where M is the order of short term prediction, usually 8–16, and $\{a_m, 1\leqq m\leqq M\}$ are the linear prediction coding (LPC) coefficients. Similarly, the long term prediction filter transfer function L(z) is given by:

$$L(z)=1-C(z)=1-\sum_{m=p-1}^{p+1} c_m z^{-m},$$

where p is the delay value (for voice signals usually equalling the pitch period, limited to $20<p<120$ at 6.4–8 kHz sampling rates), and $\{c_m, p-1\leqq m\leqq p+1\}$ are the long term prediction parameters. For each input signal block of N samples, these parameters (i.e., $\{a_m\}$, $\{c_m\}$ and p) are determined by well known methods, (L. R. Rabiner and R. W. Schafer, "Digital Processing of Speech Signals," Prentice-Hall, Inc., Englewood Cliffs, N.J. (1978)), quantized for transmission and used for performing the prediction filtering operations. For telephony voice, about 64 bits are needed for adequate quantization of the parameters for each block of the input signal.

Residual Quantization

Let $\{x(i), 0\leqq i<N\}$ denote the current block of N samples. The prediction residual r(i) is obtained by $$r(i)=S(z)L(z)x(i),\ 0\leqq i<N.$$

The residual signal has to be quantized at a low bit rate, typically at 1–2 bit/sample. For example, for encoding voice sampled at 6.4 kHz at 16 kbit/s rate, 2 bits are available for the quantization of each sample of the residual signal. Quantization has to be carried out such that the quantization resultant impairment in the reconstructed version of the input signal is minimized (N. S. Jayant and P. Noll, "Digital Coding of Waveforms," Prentice-Hall, Inc., Englewood Cliffs, N.J. (1984)). For voice and audio signals, it is also important to minimize the impairment as perceived by the human ear. In order to realize this goal, the auditory masking properties of the human ear must be taken into account during residual quantization.

Existing Method: Noise Feedback Quantization

In APC, the residual is quantized inside a feedback loop which filters the quantization noise through a noise shaping filter 1 and sums the result using adder 2 with the residual to form the quantizer 3 input. The scheme is shown in FIG. 1. It should be noted that time domain samples are quantized directly. The power spectrum of the reconstruction noise is controlled by the transfer function of the feedback filter. The desired spectral shaping is achieved by using a feedback filter with the transfer function F(z) given by:

$$F(z)=(1-C(z))A(z/B)+C(z).$$

where β is limited by $0\leqq\beta\leqq 1$ and is usually 0.7.

Disadvantages of the Noise Feedback Quantization Scheme

There are two main disadvantages to the above scheme. First, due to the noise feedback, the variance of the quantizer input signal is higher than the variance of the residual. This is especially true due to the low rate quantization. As a result, the performance of the quantizer, referenced to the residual variance, will be reduced. Secondly, and more significantly, the feedback loop may become unstable if the power gain through the feedback filter becomes large. This can occur during signals of large spectral dynamic range such as sinusoids and resonant voiced sounds. Controlling the stability by limiting the power gain usually results in a loss in the overall performance of the codec.

SUMMARY OF THE INVENTION

It is an object of the present invention to obtain quantization of a residual signal without the disadvantages discussed above with respect to the prior art.

This invention pertains to a method and apparatus for quantizing a residual signal that is encountered in predictive coding techniques. These techniques are commonly applied to voice and audio signals to reduce the bit rate required for transmission while maintaining a certain level of quality. In particular, the proposed technique is applicable to transmission of signals at the rate of 1–2 bit/sample while maintaining subjective transparent quality.

In predictive coding, reduction in transmission bit rate is accomplished by the removal of signal redundancies by prediction filtering. The prediction filtering operation results in a residual signal whose information content is highly nonredundant and has to be quantized by a low rate quantizer and transmitted to the receiver. The residual quantization is crucial since it determines to a large extent the quality that is attainable by the technique at a given bit rate.

Existing approaches to residual quantization at the above transmission rates are usually implemented in the time domain. This invention proposes the Transform Domain Vector Quantization (TVQ), a novel approach to implementing the residual quantization. Here, the residual is first transformed from the time domain to a transform domain by an orthogonal transform such as the discrete cosine transform (DCT). The resulting transform coefficients are grouped into vectors. This grouping is performed in an adaptive manner, based on the spectral power distribution of the input signal. The bits available for the transmission of the residual signal are divided equally among the vectors. Each of these vectors is quantized by a vector quantizer. A weighting function that takes into account the auditory noise masking properties of the human ear as well as the synthesis filter response characteristics is used to select the optimum code vector to represent each transform coefficient vector.

At the receiver, the adaptive vector formation is reconstructed and the transform coefficients are decoded. These are then inverse transformed to yield a (quantized) residual signal. This signal is used at the input to the synthesis filters to regenerate the input signal.

The proposed invention addresses the residual quantization aspect of predictive coding. In TVQ, the residual signal is transformed into a transform domain. In the transform domain, quantization and spectral shaping are implemented as open loop operations. Consequently, the problem of instability does not arise. For the same reason, increase in the variance of the residual is also not encountered. In addition, the transform domain operation is a block quantization scheme that is easily amendable to variable bit rate operation. Variations in sampling rate and bandwidth are also easily implemented.

DETAILED DESCRIPTION OF PREFERRED EMBODIMENTS

The proposed technique addresses the residual coding aspect of predictive coders. It is independent of the prediction analysis and filtering methods used in the coder, though prediction parameters are used for quantization and noise spectral shaping. Hence, in the following description, the prediction analysis and filtering will not be discussed further.

Figure 1:
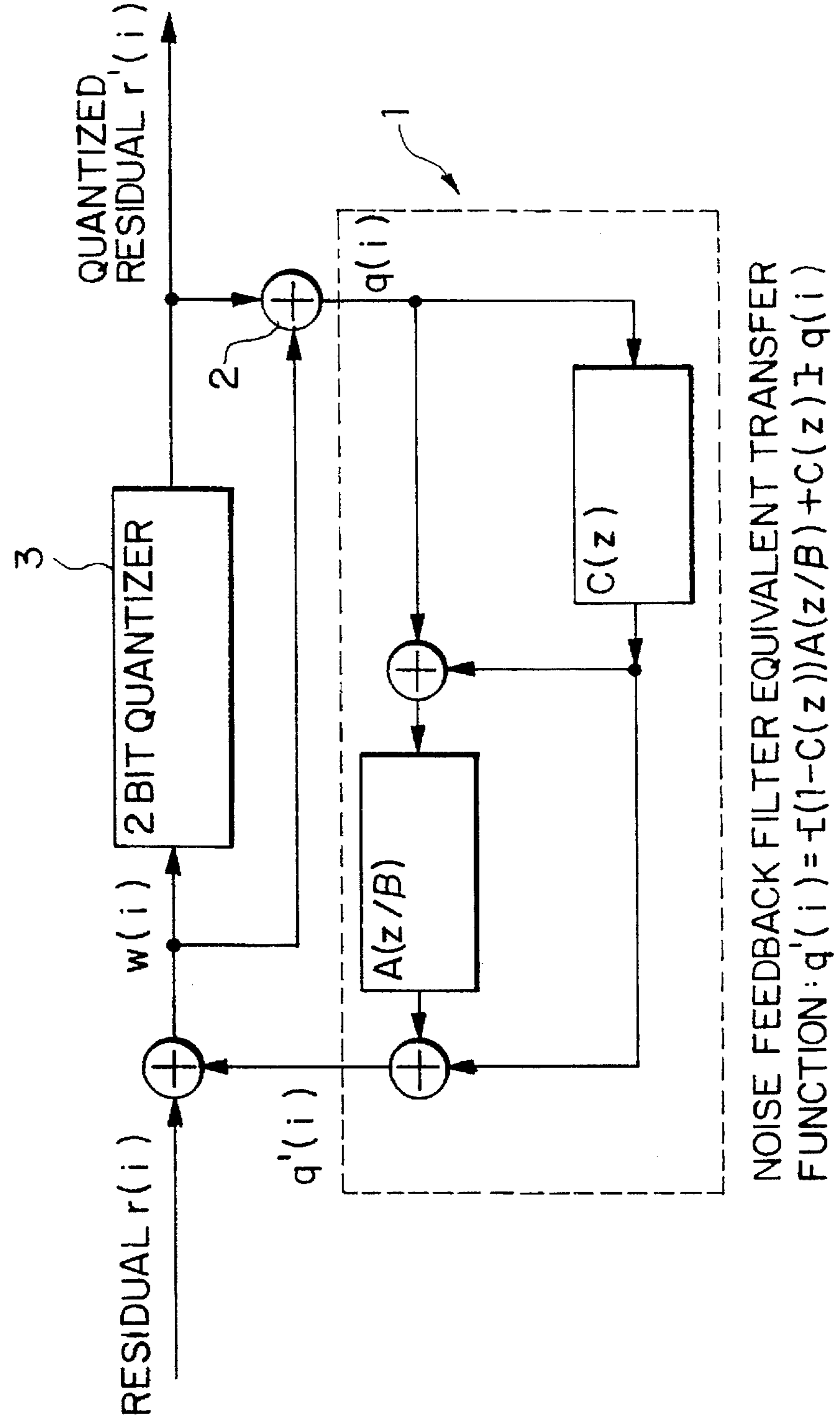
FIG. 1 PRIOR ART
FIG. 1 shows a prior art Noise Feedback Time Domain Quantization System.
Figure 2:
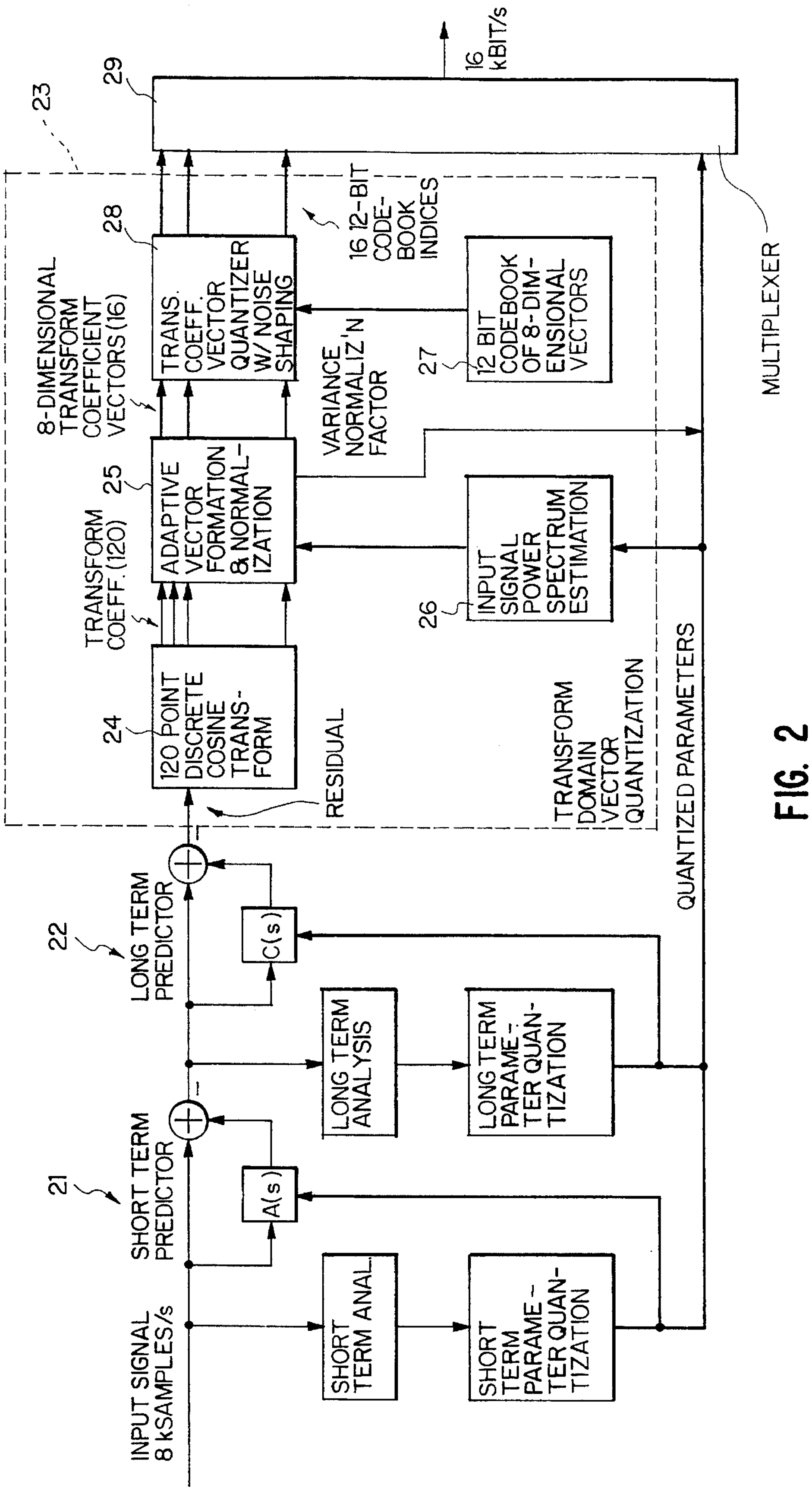
FIG. 2 shows an encoder according to the present invention.
Figure 3:
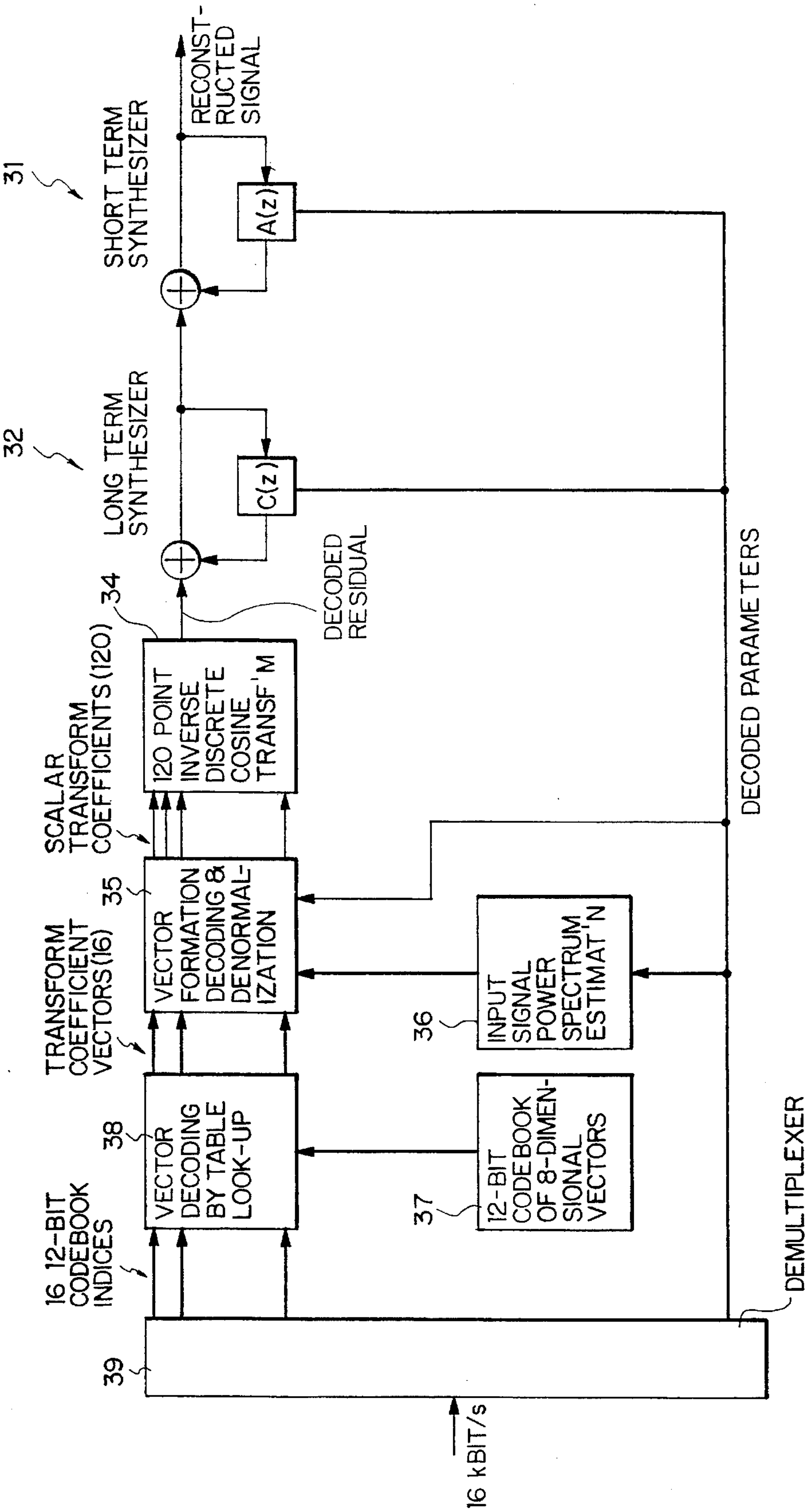
FIG. 3 shows a decoder according to the present invention.

FIGS. 2 and 3 are block diagrams of the encoder and decoder that illustrate the TVQ method for the case of 8 kHz sampling rate, N=128 samples/block, and residual quantization with a total of 192 bits (equivalently 1.5 bit/transform coefficient). The prediction and quantization parameters are transmitted using 64 bits, resulting in a bit rate of 256 bits/block or 16 kbit/s. Clearly, by varying the sampling rate, the number of bits used for residual quantization (and parameter quantization to a more limited extent), other bit rate/bandwidth combinations can be obtained with corresponding variations in quality.

FIG. 2 shows the encoder of the present invention. Short term predictor circuit 21 and long term predictor circuit 22 are well known (and described in the above-referenced U.S. Pat. No. 5,206,884 and will thus not be described here further.

Transform Domain Vector Quantization circuit 23 includes DCT circuit 24, adaptive vector formation and normalization circuit 25, input signal power spectrum estimation circuit 26, codebook circuit 27 and quantizer 28. Multiplexer 29 is also shown.

In FIG. 3, for the decoder, analogous reference numerals (31–39) are used for analogous (to numerals 21–29 of FIG. 2) circuit elements.

The TVQ method can in general employ a broad class of orthogonal transforms. However, sinusoidal transforms such as the discrete cosine transform (DCT) and discrete fourier transform (DFT) have the advantage that the masking properties of the ear can be easily interpreted in the transform domain. For the sake of clarity and illustration, the DCT will be used in the following description. However, it should not be overlooked that a wide class of transforms can be substituted in place of the DCT without any major changes to the basic concept.

It is desirable to use a block size N that is an integer power of 2, to permit use of fast transform algorithms such as the fast fourier transform (FFT) and the fast cosine transform (FCT).

Domain Transformation

Let $\{r(i), 0 \leqq i < N\}$ be the residual samples being encoded. Domain transformation results in a set of transform coefficients $\{R(k), 0 \leqq k < N\}$. If DCT is used, transform coefficients are obtained by:

$$R(k) = \sum_{i=0}^{N} r(i)\partial(k)\cos\left\{\frac{(2i+1)\pi k}{2N}\right\}, 0 \leqq k < N,$$

where, $\delta(k)=1 \quad k=0$ $\delta(k)=\sqrt{2} \quad 1 \leqq k<N.$

DCT circuit 24 receives the time domain residual signal and transforms it into the frequency domain according to the above equations.

Adaptive Vector Formation

The set of N transform coefficients are grouped into L vectors, each of dimension D, such that N=LD by circuit 25.

The dimension D and the number L of the vectors are design parameters that are determined apriori based on considerations such as computational complexity and storage requirements of the coder. For residual quantization at 1.5 bit/transform coefficient, which corresponds to the rates of interest here, a vector dimension of D=8 leads to a 12 bit codebook, which is of reasonable complexity. In this case, the N transform coefficients are grouped into N/8 vectors of dimension 8.

The grouping of transform coefficients into vectors is not arbitrary, but must satisfy an important requirements that depends upon the power spectral density of the input signal, as modeled by the short and long term prediction parameters. Let V be a vector of transform coefficients given by $$V = \begin{bmatrix} R(i_1) \\ R(i_2) \\ \cdot \\ \cdot \\ \cdot \\ R(i_D) \end{bmatrix},$$

where, $$i_k \in (0,1,2, \ldots, N-1),\ 0 \leqq k \leqq D.$$

Let H(k) denote the synthesis filter frequency response at the frequency $2\pi k/N$. H(k) is expressed in terms of the short term predictor parameters $\{a_i,\ 1 \leqq i \leqq M\}$ and long term predictor parameters p and $\{c_i,\ p-1 \leqq i \leqq p+1\}$ as $$H(k) = \left[ \left\{ 1 - \sum_{m=1}^{M} a_m e^{-j\frac{2\pi km}{N}} \right\} \left\{ 1 - \sum_{m=p-1}^{p+1} c_m e^{-j\frac{2\pi km}{N}} \right\} \right]^{-1}.$$

Then each vector $V=[R(i_1)R(i_2) \ldots R(i_D)]^T$ must satisfy the condition $$\frac{1}{D} \sum_{j=1}^{D} \log 2|H(i_j)| = \frac{1}{N} \sum_{k=0}^{N-1} \log 2|H(k)|.$$

In other words, the average log magnitude synthesis response for each vector must equal the average log magnitude synthesis response for all the transform coefficients. This condition ensures that all vectors have the same entropy, and hence can be quantized using the same number of bits. In general, the grouping is nonunique. Further, it is possible to generate extreme examples where such a grouping is not possible at all. However, for practical signals, a satisfactory grouping can always be obtained. Input signal power estimation circuit 26 supplies an estimate of the input signal power to the circuit 25 so that the above equations may be carried out by circuit 25. Circuit 26 produces an estimate of the input signal power from the long term and short term parameters in a well known fashion (as described in U.S. Pat. No. 5,206,884.

Adaptive Grouping Algorithm

The formation of the vectors that meet the above requirements is performed by an adaptive grouping algorithm. A grouping that exactly meets the above condition usually requires a large amount of computation. As a result, in practice, a vector formation that approximately satisfies the above condition is used.

There are a number of approaches to constructing the adaptive grouping algorithm. Here, an approach based on progressive binary grouping is proposed that is suitable when the dimension D is an integer power of 2.

The algorithm initially forms groups of two transform coefficients such that the average log magnitude synthesis response for each pair is as close as possible to the overall average. This is accomplished by selecting each (ungrouped) transform coefficient and grouping it with the transform coefficient among the remaining (ungrouped) transform coefficients that makes the average of the pair closest to the overall average. In this manner, the N transform coefficients are grouped into $$\frac{N}{2}$$

transform coefficient subgroups.

In the next pass, the subgroups are paired to form larger subgroups by using the same criterion as above. Each subgroup is treated as a unit and the transform coefficients that compose the subgroup are not separated. This process is repeated until groups of the desired dimension are obtained. In other words, to obtain vectors of dimension D, the algorithm also generates subvectors of dimension $$\frac{D}{2}, \frac{D}{4}, \ldots, 2.$$

The adaptive vector formation can be recovered exactly at the decoder in the absence of channel impairments. This is since the algorithm uses quantized short term and long term parameters that are also available at the decoder.

Vector Quantization

The total available number of bits for the quantization of the residual signal is divided equally among the vectors. For example, if 192 bits are available for quantization of 128 transform coefficients divided into 8 dimensional vectors, each vector is quantized using a 12 bit codebook stored in codebook circuit 27. The codebooks are populated by random variates of a suitable distribution. If DCT is used, the codebook is populated by univariate, zero means Gaussian random variables. The transform coefficients are normalized to unit variance and the normalization constant is log quantized using 7 bits and transmitted to the decoder.

Each vector is quantized by quantizer circuit 28 by an exhaustive search in the codebook. The optimum codevector is determined by a total weighted squared error criterion. The weighting is determined by the long and short term predictor parameters and a noise masking parameter β. The weighting coefficient for transform coefficient R(k) is w(k) which is given by $$w(k) = \left| \left\{ 1 - \sum_{m=1}^{M} a_m \beta^m e^{-j\frac{2\pi km}{N}} \right\} \left\{ 1 - \sum_{m=p-1}^{p+1} c_m e^{-j\frac{2\pi km}{N}} \right\} \right|^{-2}.$$

The noise masking parameter β is usually between 0.7 and 0.9. Corresponding to the normalized transform coefficient vector V defined earlier, the weighting vector W is defined as $$W=\begin{bmatrix} w(i_1) \\ w(i_2) \\ \cdot \\ \cdot \\ \cdot \\ w(i_D) \end{bmatrix},$$

Then the weighted error measure $E_n$ between the transform coefficient vector V and the $n^{th}$ codevector $U_n$ is computed by $$E_n=[W^T(V-U_n)(V-U_n)^{*T}W],$$

where * represents complex conjugation and T represents transposition. For real transforms such as the DCT the above expression simplifies to $$E_n=[W^T(V-U_n)]^2.$$

Each transform coefficient vector is quantized to the codevector that results in the smallest error measure. The index of each codevector is sent to multiplexer 29 to be transmitted to the decoder, along with the bits encoding the short and long term parameters and the variance normalization factor.

A vector quantization technique is also disclosed in Ser. No. 07/732,024 involving the same inventor and assignee and is herein incorporated by reference.

Inverse Transformation and Decoding

At the decoder, as shown in FIG. 3, the predictor parameters are decoded and are used to determine the vector formation by circuit 35 by the same procedure as used at the encoder. Then the transform coefficient vectors are decoded by table look-up operations by circuit 38 in the codevector table in circuit 37. The transform coefficients are inverse transformed by circuit 34 to obtain the decoded version of the residual signal. Let $\{R'(k), 0\leq k<N\}$ denote the decoded transform coefficients. The inverse transform, in the case of the DCT is given by $$r'(i)=\frac{1}{N}\sum_{k=0}^{N-1} R'(k)\partial(k)\cos\left\{\frac{(2i+1)\pi k}{2N}\right\}, 0\leq i<N,$$

where, $$\delta(k)=1 \quad k=0$$

$$\delta(k)=\sqrt{2} \quad 1\leq k<N$$

and $\{r'(i), 0\leq i<N\}$ denotes the decoded version of the residual signal. This signal acts as the excitation to the cascade of long and short term synthesis filters (32 and 31, respectively) to generate the decoded version of the input signal. The transfer functions of the long and short term synthesis filters respectively are given by $$L_S(z)=\frac{1}{1-\sum_{m=p-1}^{p+1} c_m z^{-m}},$$

and $$S_S(z)=\frac{1}{1-\sum_{m=1}^{M} a_m z^{-m}}.$$

Features of the Invented Technique

In summary, the following are important features of the invention:

1. The prediction residual is quantized in a transform domain.
2. The choice of the transform is not as crucial as in other frequency domain coders such as transform coders. Transforms based on the discrete cosine transform and discrete fourier transform may be used with equally good results.
3. The prediction residual is quantized by vector quantization, where the vectors are formed adaptively, depending on the spectral power distribution of the input signal.

Although specific examples of the invention have been set forth above, the invention is not to be so limited. The proper and intended scope of the invention is defined by the claims.

What is claimed is:

1. An apparatus for processing digital information signals at a transmitter end of a communications system before said signals are transmitted to a receiver end, said apparatus comprising:

input means for receiving an input digital signal;

adaptive prediction means for performing adaptive prediction upon said input digital signal received by said input means; and transform domain vector quantization means for transforming the output of said adaptive prediction means into frequency domain coefficients, grouping said coefficients into vectors and quantizing said vectors, wherein said transform domain vector quantization means further includes:

an input signal power spectrum estimation means for estimating the input signal power spectrum of said input digital signal; and coefficient grouping means for grouping said coefficients into vectors in an adaptive manner based on results obtained from said input signal power spectrum estimation means.

2. An apparatus according to claim 1 wherein said transform domain vector quantization means further includes:

a means for making an average log magnitude synthesis response for each vector substantially equal to the average log magnitude synthesis response for all the frequency domain coefficients.

3. An apparatus for processing digital information signals at a transmitter end of a communications system before said signals are transmitted to a receiver end, said apparatus comprising:

input means for receiving an input digital signal;

adaptive prediction means for performing adaptive prediction upon said input digital signal received by said input means, said adaptive prediction means including both a short term predictor and a long term predictor; and transform domain vector quantization means for transforming the output of said adaptive prediction means into frequency domain coefficients, grouping said coefficients into vectors, and quantizing said vectors, said transform domain vector quantization means includes quantizer means for quantizing the vectors by using a weighting function that takes into account auditory noise masking properties of the human ear as well as parameters obtained from said short and long term predictors.

4. An apparatus according to claim 3 wherein said quantizer means includes a codebook of possible codevectors.

5. An apparatus for processing digital information signals at a transmitter end of a communications system before said signals are transmitted to a receiver end, said apparatus comprising:

input means for receiving an input digital signal; and transform domain vector quantization means for transforming the received input digital signals into frequency domain coefficients, grouping said coefficients into vectors and quantizing said vectors, wherein said transform domain vector quantization means further includes a means for making an average log magnitude synthesis response for each vector substantially equal to the average log magnitude synthesis response for all the frequency domain coefficients.

* * * * *